(12) United States Patent
Cabrera-Cordon et al.

(10) Patent No.: US 10,554,590 B2
(45) Date of Patent: Feb. 4, 2020

(54) PERSONALIZED AUTOMATED AGENT

(71) Applicant: Microsoft Technology Licensing, LLC, Redmond, WA (US)

(72) Inventors: Luis Eduardo Cabrera-Cordon, Bothell, WA (US); Vesselin Atanassov Diev, Kirkland, WA (US); Giampaolo Battaglia, Seattle, WA (US); Daniel Anvar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 238 days.

(21) Appl. No.: 15/402,092

(22) Filed: Jan. 9, 2017

(65) Prior Publication Data
US 2018/0077088 A1 Mar. 15, 2018

Related U.S. Application Data

(60) Provisional application No. 62/385,822, filed on Sep. 9, 2016.

(51) Int. Cl.
*G06F 15/16* (2006.01)
*H04L 12/58* (2006.01)
(Continued)

(52) U.S. Cl.
CPC ........ *H04L 51/02* (2013.01); *G06F 16/90335* (2019.01); *G06N 5/022* (2013.01);
(Continued)

(58) Field of Classification Search
CPC ......... H04L 51/02; H04L 67/02; H04L 51/22; H04L 5/10; H04L 51/32; H04L 67/306;
(Continued)

(56) References Cited

U.S. PATENT DOCUMENTS 7,460,659 B2   12/2008 Shambaugh et al.
7,539,656 B2   5/2009 Fratkina et al.
(Continued)

OTHER PUBLICATIONS

Woollaston, Victoria, "Google files patent for robot that writes your Facebook posts, emails and tweets—but will need FULL access to scan your accounts", Published on: Nov. 29, 2013 Available at: http://www.dailymail.co.uk/sciencetech/article-2515635/Google-files-patent-robot-writes-Facebook-posts-emails-tweets-need-FULL-access-scan-accounts.html.
(Continued)

*Primary Examiner* — Michael A Keller
*Assistant Examiner* — Thao D Duong
(74) *Attorney, Agent, or Firm* — Merchant & Gould

(57) ABSTRACT

Generating an automated agent enabled to engage in a multi-turn discussion with a user in response to a received request. For example, the automated agent is operative to provide a response on behalf of an agent owner. A knowledge database is generated based on the agent owner's context (e.g., email conversations, calendar data, organizational chart, document database). A request for information is received and analyzed for understanding the request and for gauging a level of frustration of the requesting user. An urgency level of the request is determined based at least in part on the level of frustration of the requesting user. A query of the knowledge database is made for determining a response to the request, wherein the determined response is based at least in part on the urgency level of the request. A response is generated and provided to the requesting user.

20 Claims, 9 Drawing Sheets

(51) Int. Cl.
*H04L 29/08* (2006.01)
*G06N 5/02* (2006.01)
*G06N 20/00* (2019.01)
*G06F 16/903* (2019.01)

(52) U.S. Cl.
CPC ............. *G06N 20/00* (2019.01); *H04L 51/26* (2013.01); *H04L 67/306* (2013.01)

(58) Field of Classification Search
CPC ....... H04L 51/04; H04L 67/22; H04L 51/046; H04L 51/12; G10L 15/22; G10L 2015/223
See application file for complete search history.

(56) References Cited

U.S. PATENT DOCUMENTS

| | | | |
|---|---|---|---|
| 8,279,779 B2 | 10/2012 | Singh et al. | |
| 8,639,638 B2 | 1/2014 | Shae et al. | |
| 9,386,152 B2 | 7/2016 | Riahi et al. | |
| 2005/0111653 A1* | 5/2005 | Joyce .................... | H04M 3/523 379/265.09 |
| 2005/0213743 A1* | 9/2005 | Huet ...................... | G06Q 10/10 379/265.09 |
| 2006/0215824 A1* | 9/2006 | Mitby .................... | G10L 15/22 379/100.05 |
| 2007/0294229 A1 | 12/2007 | Au | |
| 2008/0096533 A1 | 4/2008 | Manfredi et al. | |
| 2009/0076795 A1* | 3/2009 | Bangalore ........... | G06F 17/2785 704/9 |
| 2014/0278343 A1* | 9/2014 | Tran .................... | G06F 17/2785 704/2 |
| 2014/0280623 A1 | 9/2014 | Duan | |
| 2015/0254675 A1 | 9/2015 | Kannan et al. | |
| 2018/0165582 A1* | 6/2018 | Cha ....................... | G06N 99/005 |

OTHER PUBLICATIONS

Yu, et al., "A Personalized Chatterbot Based on Facebook Update", In Honors Thesis of Colby College, Apr. 30, 2015, 1 page.

"Virtual Chat", Retrieved on: Aug. 30, 2016 Available at: http://www.bmc.com/it-solutions/virtual-chat.html.

"Wise.io Introduces First Intelligent Auto Reply Functionality for Customer Support Organizations", Published on: Jan. 27, 2016 Available at: http://www.wise.io/news/wise.io-introduces-first-intelligent-auto-reply-functionality-for-customer-support-organizations.

"Digital Employee", Published on: Jan. 27, 2016 Available at: http://www.artificial-solutions.com/natural-language-interaction-solutions/digital-employee/.

"Introducing Hybrid Chat: AI-Powered Virtual Assistance Combined with Human Live Chat", Published on: Apr. 27, 2016 Available at: https://www.inbenta.com/en/blog/entry/introducing-hybrid-chat-ai-powered-virtual-assistance-combined-with-human-live-chat.

Kapko, Matt, "Facebook is bringing in the bots and AI", Published on: Apr. 13, 2016 Available at: http://www.cio.com/article/3055903/social-networking/facebook-is-bringing-in-the-bots-and-ai.html.

Moynihan, Tim, "How Google's AI Auto-Magically Answers Your Emails", Published on: Mar. 17, 2016 Available at: http://www.wired.com/2016/03/google-inbox-auto-answers-emails/.

* cited by examiner

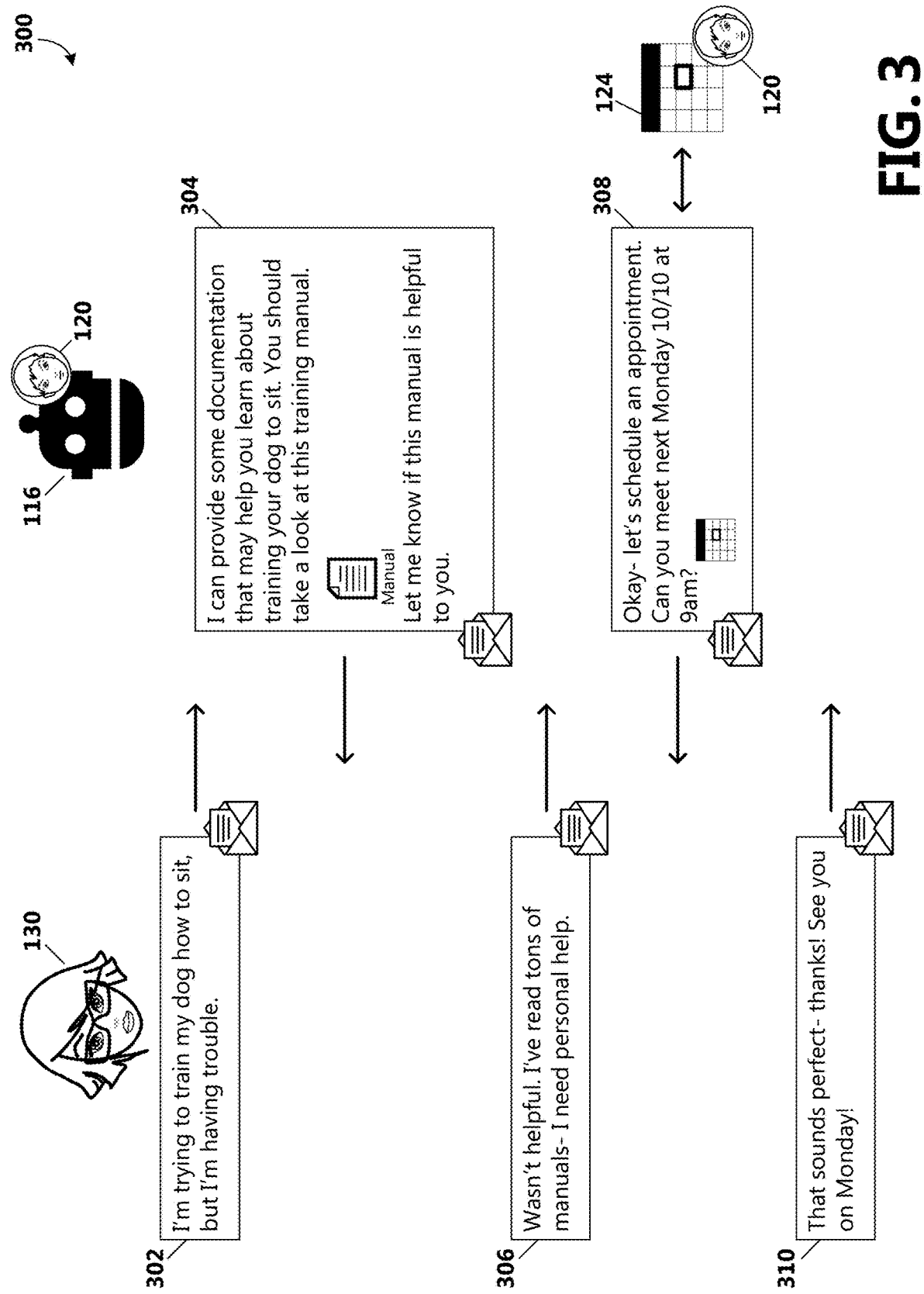

PERSONALIZED AUTOMATED AGENT

RELATED APPLICATIONS

This application claims priority from U.S. Provisional Patent Application No. 62/385,822 titled, "PERSONALIZED AUTOMATED AGENT" and having a filing date of Sep. 9, 2016, which is incorporated herein by reference.

BACKGROUND

Due to various reasons, there are times when digital workers need to unplug from their email, phone calls, or other digital communications. For example, due to a vacation, during personal time, or because of other commitments, a digital worker may not be able to promptly respond to calls, emails, or text messages. At the same time, particularly in today's always-connected world, business cannot slow down or stop simply because a person is out-of-the-office or otherwise unavailable.

It is common practice for a digital worker to set an automatic reply when the worker plans to be out of the office, such as via an email application or outgoing voice message. While this can provide helpful information to a person trying to contact the digital worker, there can be several limitations. For example, the same message is often provided to all people attempting to contact the worker. As another example, the amount of information that the digital worker may need to provide to various contacts may be impractical, which can make it difficult for the worker's contacts to get the information they need. As another example, even when an automatic reply is provided, the digital worker may still need to monitor for emails or other messages that may be urgent or require some attention.

Being unable to promptly respond to communications can cause anxiety for the digital worker, who may be expected to or feel obligated to check and respond to communications. Additionally, a customer, manager, or other person trying to reach the digital worker may have an urgent issue or may become frustrated if he/she does not receive a prompt response from the digital worker.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a device, method, and computer-readable medium for generating an automated agent enabled to engage in a multi-turn discussion with a user in response to a received request. For example, the automated agent is operative to provide a response on behalf of an agent owner. A knowledge database is generated based on the agent owner's context (e.g., email conversations, calendar data, organizational chart, document database). A request for information is received and analyzed for understanding the request and for gauging a level of frustration of the requesting user. An urgency level of the request is determined based at least in part on the level of frustration of the requesting user. A query of the knowledge database is made for determining a response to the request, wherein the determined response is based at least in part on the urgency level of the request. A response is generated and provided to the requesting user. According to aspects, the personalized automated agent is able to handle communications on behalf of the agent owner, thus providing an improved user experience and improved user interaction efficiency. Network traffic can be reduced by eliminating additional communications to and from the agent owner that are automatically resolved by the personalized automated agent.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings:

FIG. 3 is an illustration of another example communication between a personalized automated agent and a user;

DETAILED DESCRIPTION

Figure 1:
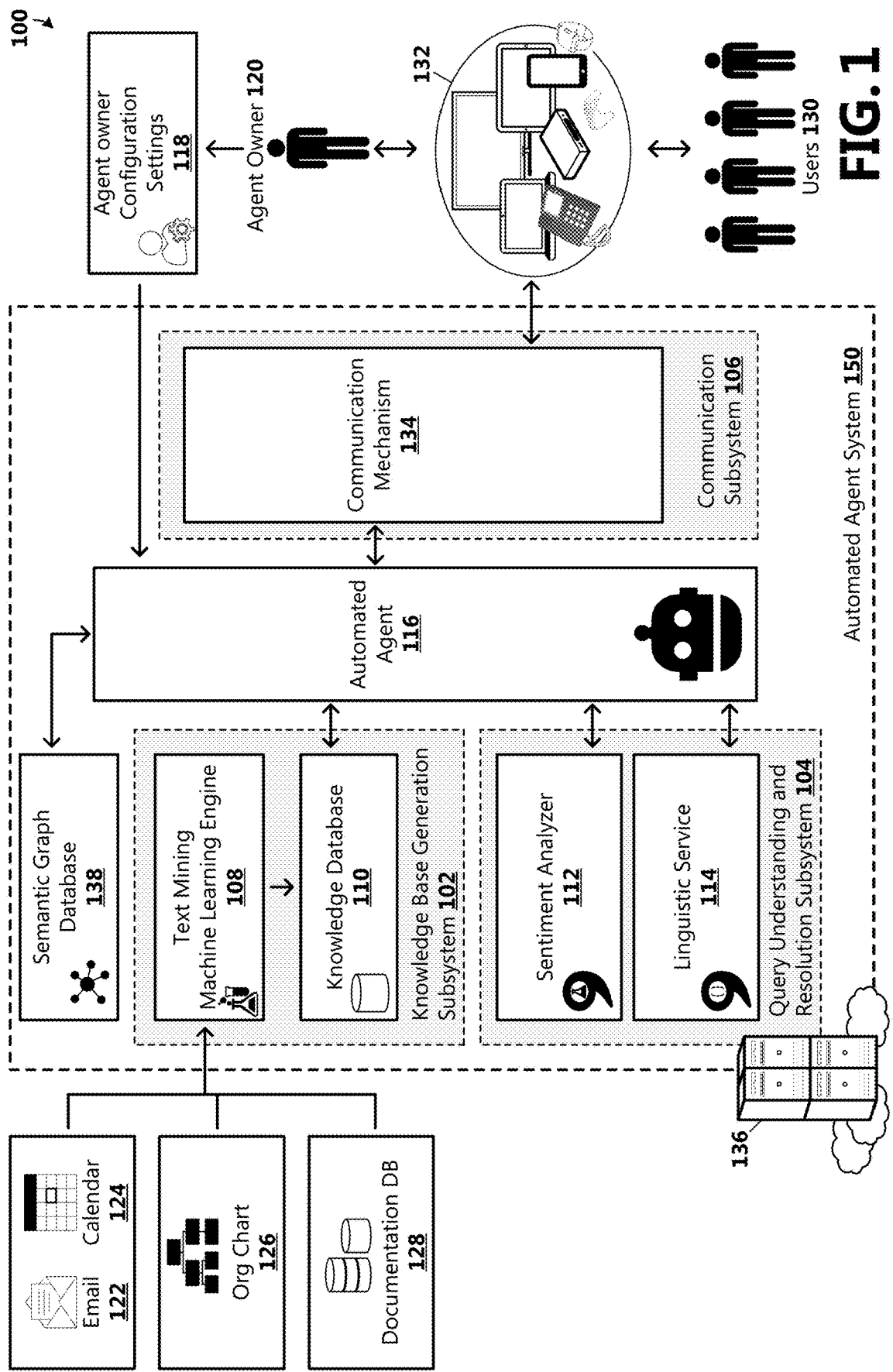
FIG. 1 is a block diagram illustrating an example environment in which an automated agent system may be implemented for providing personalized automated assistance.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a device, method, and computer-readable medium for providing personalized automated assistance. FIG. 1 illustrates a block diagram of a representation of a computing environment 100 in which personalized automated assistance may be implemented. As illustrated, the example environment 100 includes an automated agent system 150, operative to generate a personalized automated agent 116 personalized to a user (agent owner 120) for receiving a query and providing a response on behalf of the user. According to an aspect, the automated agent system 150 comprises a knowledge base generation subsystem 102, a query understanding and resolution subsystem 104, a communication subsystem 106, and the personalized automated agent 116. In some examples, the automated agent system 150 further includes a semantic graph database 138. In some examples, the automated agent system 150 comprises one or a plurality of computers (e.g., server computers 136) that are programmed to provide services in support of the operations of providing personalized automated assistance. The server computers 136 may comprise various types of computing devices. The hardware of these computing devices is discussed in greater detail in regard to FIGS. 5, 6A, 6B and 7.

The knowledge base generation subsystem 102 is illustrative of a software module, system, or device, operative to build a knowledge database 110 based on the agent owner's context, which is utilized by the personalized automated agent 116 for generating a response to a received query on behalf of the agent owner 120. According to an aspect, the knowledge base generation subsystem 102 comprises a text mining machine learning engine 108, operative to mine various collections of data associated with the agent owner 120 (i.e., the agent owner's context), and perform machine learning techniques on the various collections of data for analyzing and extracting: keywords; topics; categories; relationships among keywords, topics, and categories; and related entities from structured or unstructured text. For example, the various data collections can include, but are not limited to, the agent owner's email conversations 122, calendar data 124, organizational chart 126, and documentation database 128. Other data collections, such as configuration settings 118 that the agent owner 120 sets with the automated agent system 150 (e.g., how to reach the agent owner 120, what times the agent owner 120 can be reached, which users 130 are allowed to interrupt or disturb the agent owner 120), social networking threads, contacts lists, etc., are possible and within the scope of the disclosure. The various data collections may be stored in a single database, or stored across various repositories and systems. In some examples, the text mining machine learning engine 108 employs a plurality of services, for example, a service utilized for keyword or key phrase extraction, another service utilized for topic detection, a general recommendations service, etc. In one example, natural language processing is used to extract a list of strings denoting key talking points in the collections of data being analyzed. In another example, keywords, topics, categories, and entities can be extracted, and relationships and degrees of similarity can be computed using a recommender service. In another example, a topic detection service detects topics for a collection of data, wherein a topic may be identified with a key phrase, which can be one or more related words. Generally, the automated agent system 150 learns about the agent owner 120 from the agent owner's interactions, communications, relationships, etc. For example, the system learns who the agent owner 120 interacts with, understands topics discussed with other individuals, learns how the agent owner 120 interacts with specific types of content, learns how the agent owner 120 interacts with other individuals in association with specific requests or topics, etc.

As an example, a category identified in the agent owner's context based on the agent owner's emails 122 or conversations in the agent owner's mail folder(s) may be "text analytics." Other keywords identified as related to "text analytics" in the agent owner's context may include "topic detection" or "sentiment analysis." Based on an organizational chart, or the agent owner's contacts or emails 122, Bob, who is a program manager, may be identified in the agent owner's context as an entity related to "text analytics." Accordingly, when a user 130 asks the personalized automated agent 116 a question on "text analytics," or any of its related keywords, the personalized automated agent 116 is enabled to understand that Bob might be a person to whom to recommend routing the question.

The knowledge database 110 is illustrative of a repository, operative to store data. In the automated agent system 150, the knowledge database 110 is operative to store the extracted keywords, topics, categories, and entities, as well as the identified relationships and calculated degrees of similarity between the keywords, topics, categories, and entities. In some examples, a knowledge graph is used to represent keywords, topics, categories, and entities as nodes, and attributes and relationships between the nodes as edges, thus providing a structured schematic of entities and their properties and how they relate to the agent owner 120.

The communication subsystem 106 is illustrative of a software module, system, or device, operative to provide a communication mechanism 134 for enabling a multi-turn discussion or conversation with a user 130. According to an aspect, the automated agent system 150 comprises a communication mechanism 134 for communicating with a user 130 via various channels 132. When communicating with a user 130, the personalized automated agent 116 is operative to receive a natural language query. For example, users 130 may communicate with and provide a query to the automated agent system 150 via the communication mechanism 134 through such channels 132 as email, various text messaging services, digital personal assistant applications, social networking services, telephone, online video or voice conferencing, etc. In some examples, the communication subsystem 106 enables a multi-turn discussion or conversation with the agent owner 120. According to an aspect, the agent owner 120 may utilize one of various communication channels 132 for interacting with the personalized automated agent 116. As used herein when describing communicating a request, response, or feedback with the personalized automated agent 116, users 130 may include the agent owner 120. For example, the agent owner 120 may communicate with the personalized automated agent 116 to look up information on behalf of the agent owner 120, find documentation, schedule appointments or meetings, etc.

In some examples, the automated agent system 150 further includes a semantic graph database 138 for storing relationships extracted through the communication subsystem 106. Accordingly, the personalized automated agent 116 is enabled to learn from a user's input, and thus provide an improved and more powerful assistant. A user 130 (or the agent owner 120) is enabled to enrich the personalized automated agent 116 by telling the agent the information it needs to learn (e.g., "Carl is working on the ABC project"; "Joe is Anna's husband"; "Johanna is an expert on Semantic Graphs"; "There is good information on machine learning at www.machinelearning.com").

According to an aspect, when a communication from a user 130 or the agent owner 120 is received, the communication subsystem 106 is operative to classify whether an expression is providing information for storage or requesting information for retrieval. For example, when an expression is of a "store information" class, the communication subsystem 106 is operative to identify entities in the expression (e.g., Joe, Anna) and the relationship between identified entities (e.g., "is husband of"). When the entities and relationship are identified, the entities and relationship are stored in the semantic graph database 138.

In the semantic graph database 138, entities are presented as nodes and relationships between those entities are presented as edges in a relational graph maintained by the graph database. A relational graph includes nodes describing entities and a set of accompanying properties of those entities, such as, for example, names, titles, ages, addresses, etc. Each property can be considered a key/value pair—a name of the property and its value. In other examples, entities are represented as nodes that include documents, meetings, communication, etc., as well as edges representing relations among these entities, such as, for example, an edge between a person node and a document node representing that person's authorship, modification, or viewing of the document. In some examples, the semantic graph database 138 may be preconfigured with common relationship types for particular scenarios (e.g., "is an expert in," "is documentation for"). The semantic graph database 138 may include or be in communication with a synonyms service or a language understanding model for ensuring a single relationship is used to represent relationships can be expressed in different ways. For example, the relationship "is husband of" is synonymous with "is partner of."

The semantic graph database 138 may be queried by users 130 via graph queries to learn about the relationships between entities. A user 130 or the agent owner 120 may use the personalized automated agent 116 to ask questions for information that has been fed into the system (e.g., "what is the name of Anna's husband?" "who knows about semantic graphs?"). For example, responsive to asking a question, the communication subsystem 106 is operative to issue a graph query.

Users 130 may utilize a computing device to remotely access the personalized automated agent 116 through a network or a combination of networks, which include, for example and without limitation, a wide area network (e.g., the Internet), a local area network, a private network, a public network, a packet network, a circuit-switched network, a wired network, and/or a wireless network. In some examples, users 130 may utilize a phone, and the network is a phone system. In this case, the server includes voice detection.

In some examples, the communication channel via which a user 130 communicates with the personalized automated agent 116 employs a user interface (UI) by which the user 130 can submit questions, requests, commands, or other input and by which responses to such input or other information may be delivered to the user 130. In one example, the input may comprise user speech that is captured by a microphone of the computing device. In some examples, such as when communicating via a telephone call, video, or voice conference, the communication subsystem 106 may include a speech-to-text and text-to-speech component.

The query understanding and resolution subsystem 104 is illustrative of a software module, system, or device, operative to provide an approachable and easy-to-use communication experience. According to an aspect, the query understanding and resolution subsystem 104 includes a linguistic service 114, operative to receive a natural language query and classify the query into an intent. In some examples, the linguistic service 114 understands entities mentioned by a user 130, such as topics, individuals, etc., that may provide additional context to determine and provide a better answer to the user's question or query. In some examples, the linguistic service 114 includes a plurality of language models for supporting a plurality of world languages. According to one aspect, the linguistic service 114 is trained with common questions or requests that may be asked when the agent owner 120 is out of the office or otherwise unavailable.

According to an aspect, the query understanding and resolution subsystem 104 further includes a sentiment analyzer 112 operative to monitor an overall sentiment of a conversation between the personalized automated agent 116 and a user 130. In some examples, the sentiment analyzer 112 gauges a level of frustration of the user 130 for determining how to handle to user's request or query. For example, the sentiment analyzer 112 may utilize classification techniques, which may utilize input features such as n-grams, features generated from part-of-speech tags, and word embeddings to calculate a numeric score. A higher score may indicate a positive sentiment (e.g., low frustration level), while a lower score may indicate a negative sentiment (e.g., high frustration level). When a negative sentiment is detected, the user's request may be escalated to provide a response that is determined to provide an appropriate resolution to the user's request.

According to an aspect, once an intent is understood, the query understanding and resolution subsystem 104 is operative to query the knowledge database 110 to determine an appropriate answer to provide the user 130. Additional inputs may be used to compose a response. For example, the agent owner 120 may provide various agent owner configuration settings 118, such as a tone or cordiality level of the personalized automated agent 116, personal information that may be provided to a user 130 according to a determined escalation level, the agent owner's return date if the agent owner 120 is away from the office, a specific calendar or calendars to reference for scheduling purposes, how to reach the agent owner 120, what times the agent owner 120 can be reached, which users 130 are allowed to interrupt or disturb the agent owner 120, etc.

According to an aspect, the personalized automated agent 116 is operative to triage the urgency of a request or issue. In some examples, a level of urgency of a request is determined upon receiving the request based on one or more inputs. For example, the urgency of a request is determined based on one or more of: the identity of the user 130, the user's position or title, a relationship between the agent owner 120 and the user 130, a deadline mentioned in the communication, and the intent of the request. In other examples, the urgency of a request is determined after a response is provided and does not resolve the user's issue. The level of urgency of the request may also be determined based on feedback provided by the user 130. For example, the personalized automated agent 116 is operative to use a variety of inputs to assess the urgency of the issue, such as the examples described above, as well as a level of frustration (e.g., determined by analyzing sentiment analysis of the user's feedback), or a number or type of previous responses provided to the user 130 by the personalized automated agent 116.

For example, as a first response, the personalized automated agent 116 may provide documentation to the user 130 that is associated with a topic that is understood as being mentioned by the user 130 and an appropriate answer with respect to the user's intent. When the first response does not resolve the user's question or request, for example, when providing documentation does not resolve the user's query, the personalized automated agent 116 is operative to triage the urgency of the request or issue, and provide a next response based on the assessed urgency level.

As part of the triage process, the personalized automated agent 116 may provide a higher-level response. For example, the personalized automated agent 116 may look for another expert in the agent owner's organization based on the topic or context provided. The personalized automated agent 116 may provide a response to the user 130 with the other expert's contact information, or may route the request to the other expert automatically. As another example, the personalized automated agent 116 may automatically check for open calendar slots on the agent owner's and user's calendar to look for matching free slots, propose a time for a meeting, and automatically schedule a meeting without disturbing or interrupting the agent owner 120. As another example, the personalized automated agent 116 may make a determination that the issue is urgent and cannot be resolved automatically or by another expert. In this case, the personalized automated agent 116 may provide information to the user 130 to contact and potentially interrupt the agent owner 120 (e.g., provide the user 130 with the agent owner's mobile phone information), or may automatically direct the issue to the agent owner 120.

Figure 2:
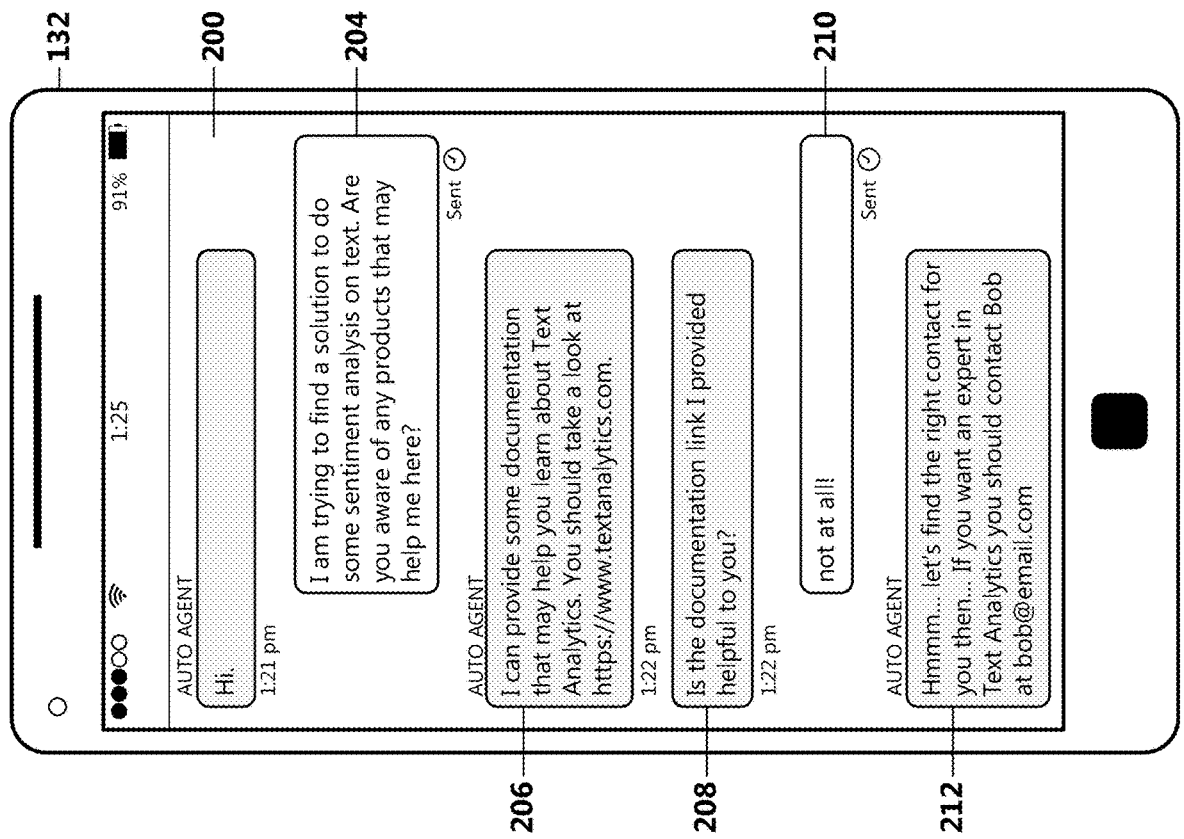
FIG. 2 is an illustration of an example communication between a personalized automated agent and a user.

With reference now to FIG. 2, an example communication 200 between the personalized automated agent 116 and a user 130 is illustrated. The example communication 200 is embodied as a series of text messages sent via a text messaging system (communication channel 132). As should be appreciated, various communication channels 132 may be utilized, and various user interface technologies may be employed where user input may be received via hardware input devices, such as mice, keyboards, remote controls, pens/styluses, and the like. As another example, user input may be received via natural input devices/methods that enable a user to interact with the computing device in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence. Responses may be made visible to the user in the form of text, images, or other visual content shown on a display within a graphical user interface (GUI). A response may also comprise computer-generated speech or other audio content that is played back via speaker(s) of the computing device or connected to the computing device.

In the illustrated example, sending the user 130 a link to an appropriate document is not sufficient to meet the user's need. For example, the user 130 provides a request 204, which the personalized automated agent 116 receives and analyzes. A determination may be made that the user's intent is a request for information about text analytics based on natural language processing and recognition of keywords or related keywords. A query may be made on the knowledge database 110 for documentation that may resolve the user's request 204, and a link to a document is provided to the user 130 in a first response 206. In a subsequent response 208, the personalized automated agent 116 requests feedback from the user 130 by asking if the provided documentation link is helpful. The user 130 provides feedback 210 that is received by the personalized automated agent 116 and analyzed. In one aspect, the feedback 210 is analyzed by the sentiment analyzer 112 for determining a level of frustration of the user 130.

In response to detecting a negative sentiment, the personalized automated agent 116 escalates the user's request to a higher urgency level to provide a more appropriate response or solution. For example and as illustrated, the personalized automated agent 116 queries the knowledge database 110 for a person to route the request 204 to or to suggest to the user 130 to contact for the help that the user 130 needs, and provides the contact information of the person to the user 130. For example, the higher urgency level response 212 (e.g., providing another expert's email contact information) is a more costly approach than sending the user 130 documentation because it may lead to an interruption for the agent owner 120, and is thus potentially more costly to the company than simply sending a document. Further, there may be higher urgency level responses that may be utilized when a request 204 is escalated to a higher urgency level.

With reference now to FIG. 3, another example communication 300 between a user 130 and the personalized automated agent 116 responding to the user on behalf of the agent owner 120 is illustrated. In the illustrated example, the user 130 sends a request 302 directed to the agent owner 120 in the form of an email over an email communication channel 132. For example, the user 130 sends a request 302, which the personalized automated agent 116 receives and analyzes. A determination may be made that the user's intent is a request for information about training a dog to sit based on natural language processing and recognition of keywords or related keywords. A query may be made on the knowledge database 110 for documentation that may resolve the user's request 302, and a link to (or an attachment of) a document is provided to the user 130 in a first response 304.

Feedback 306 provided by the user 130 is received by the personalized automated agent 116 and analyzed. In one aspect, the feedback 306 is analyzed by the sentiment analyzer 112 for determining a level of frustration of the user 130. In another aspect, the feedback 306 is analyzed by the linguistic service 114 for understanding entities mentioned by a user 130. For example, a determination may be made that the feedback 306 provided by the user 130 indicates a higher level of frustration by the user 130. Additionally, a determination may be made that the user 130 is requesting personal help. Accordingly, the personalized automated agent 116 escalates the user's request to a higher urgency level to provide a more appropriate response or solution. For example and as illustrated, the personalized automated agent 116 makes a determination to check the agent owner's calendar 124, find an available slot, and suggest a time to personally meet with the agent owner 120 in a follow-up communication 308. In response to an affirmative response 310 from the user 130, the personalized automated agent 116 automatically schedules an appointment on the agent owner's calendar 124. In a scenario where, rather than receiving an affirmative response 310, feedback is received indicating a yet higher level of frustration of the user 130, a request to speak with the agent owner 120 immediately, or based on other input data, such as the relationship between the agent owner 120 and the user 130, the subject of the request, or other factors, another escalated urgency level response may be provided. For example, a higher urgency level response may include contacting the agent owner 120 or providing the user 130 with the agent owner's mobile or personal contact information. As should be appreciated, the above examples are not meant to be limiting. Other scenarios are possible and are within the scope of the present disclosure.

Figure 4A:
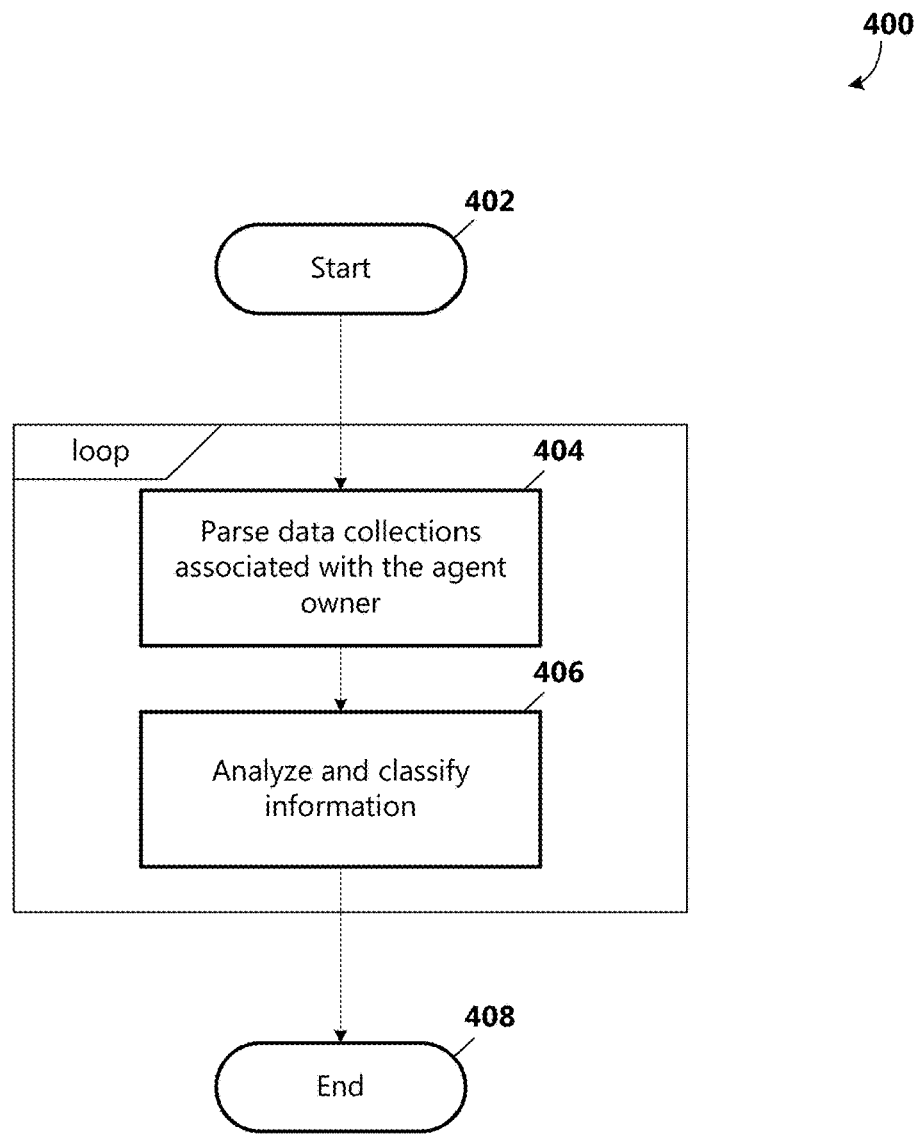
FIG. 4A is a flowchart showing general stages involved in an example method of generating and updating a knowledge database for providing personalized automated assistance.

Having described an operating environment 100, components of the automated agent system 150, and various use case examples with respect to FIGS. 1-3, FIG. 4A is a flow chart showing general stages involved in an example method 400 for generating a knowledge database 110 for providing personalized automated assistance. With reference now to FIG. 4A, the method 400 begins at START OPERATION 402, and proceeds to OPERATION 404, where the text mining and machine learning engine 108 mines the agent owner's context (e.g., email 122, calendar 124, organizational chart 126, documentation database 128), and utilizes machine learning techniques for information for generating a knowledge database 110 personalized to the agent owner 120. For example, the text mining and machine learning engine 108 analyzes various data collections associated with the agent owner 120, and extracts keywords, topics, categories, and entities. In some examples, OPERATION 404 further includes receiving a communication from a user 130, wherein the communication includes information to store in the semantic graph database 138.

The method 400 proceeds to OPERATION 406, where relationships between keywords, topics, categories, and entities are determined, and degrees of similarity between keywords, topics, categories, and entities are calculated. Further, the keywords, topics, categories, as well as entities and similarities and relationships between the keywords, topics, categories, and entities are stored in the knowledge database 110. According to an aspect, mining of the agent owner's context and updating the knowledge database 110 is a continual process. For example, the knowledge database 110 may be updated according to a schedule, according to when new content is added to various data collections, in response to a manual selection to update the knowledge database, etc. In some examples, OPERATION 406 includes identifying entities in an expression and the relationship between the entities, and storing the entities and relationship in the semantic graph database 138. The method 400 ends at OPERATION 408.

Figure 4B:
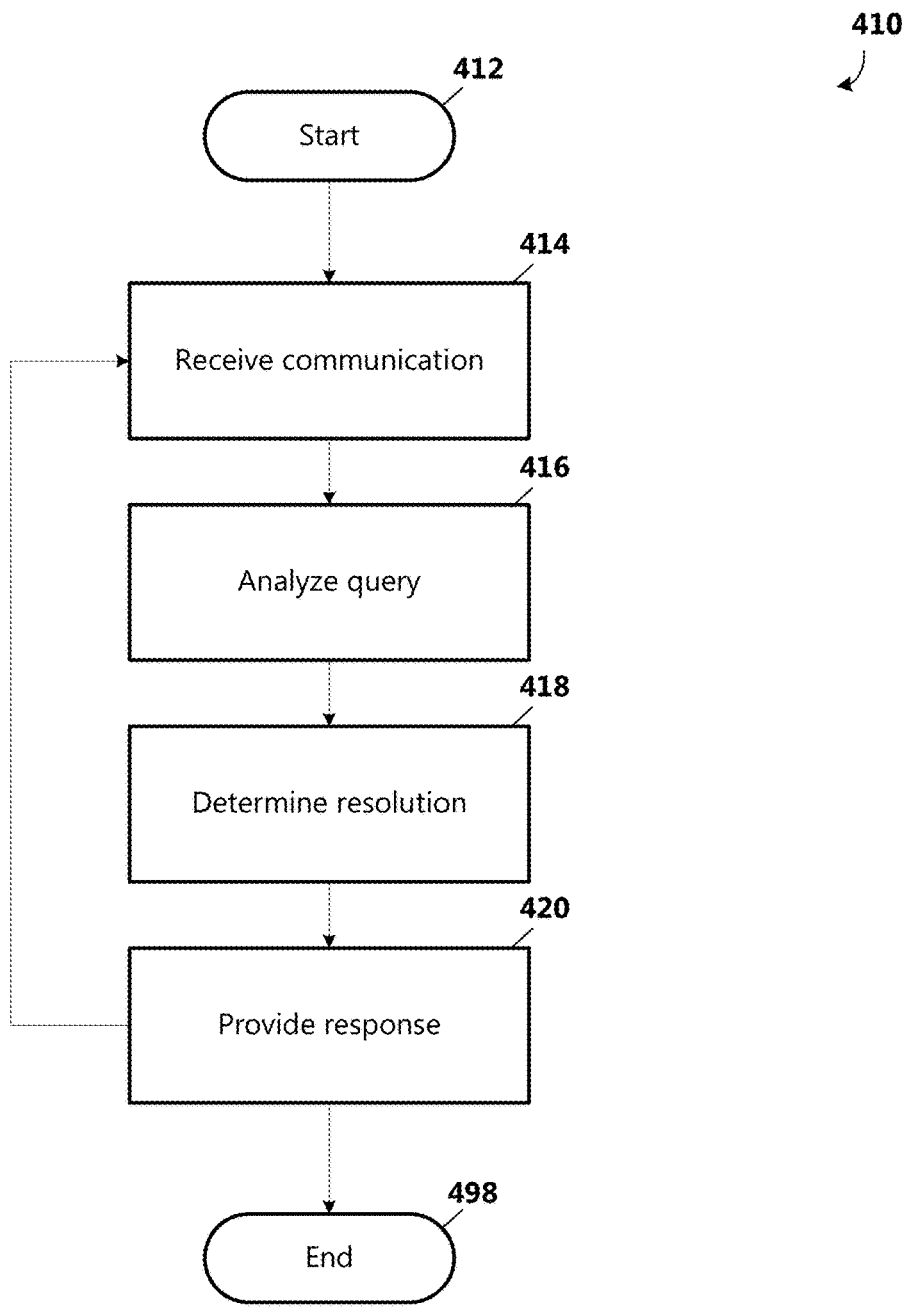
FIG. 4B is a flowchart showing general stages involved in an example method of providing personalized automated assistance.

FIG. 4B is a flow chart showing general stages involved in an example method 410 for providing personalized automated assistance. With reference now to FIG. 4B, the method 410 begins at START OPERATION 412, and proceeds to OPERATION 414, where a communication is received. For example, a user 130 sends a communication to the agent owner 120 via one of various communication channels 132. According to an aspect, a communication that would normally go to the agent owner 120 is directed to the automated agent 116 such as when the agent owner 120 is out of the office or otherwise unavailable. According to one aspect, the communication includes a request or query, for example, for information, documentation, to contact the agent owner 120, etc. In some examples, the communication is sent to the personalized automated agent 116 by the agent owner 120.

At OPERATION 416, the received communication is analyzed. For example, the linguistic service 114 receives the query, and classifies the query into an intent. In some examples, the linguistic service 114 understands entities mentioned in the communication, such as topics, individuals, etc., that may provide additional context to determine and provide an answer to the user's question or query. Further, at OPERATION 416, the sentiment analyzer 112 monitors an overall sentiment of the conversation between the personalized automated agent 116 and the user 130, and gauges a level of frustration of the user 130 for determining how to handle to user's request or query. In some examples, a level of urgency associated with the request can be determined. For example, if the request is associated with a specific topic that is related to an urgent situation or specific emergency-related words are identified, an urgency level of the request is elevated.

The method 410 proceeds to OPERATION 418, where a resolution to the query is determined. For example, the personalized automated agent 116 queries the knowledge database 110 for determining an appropriate answer to provide the user 130. In some examples, the response is based at least in part on the user's frustration level. In some examples, additional inputs are used to compose a response. For example, the response may be based on agent owner configuration settings 118, such as a tone or cordiality level of the personalized automated agent 116, personal information that may be provided to a user 130 according to a determined escalation level, the agent owner's return date if the agent owner 120 is away from the office, a specific calendar or calendars to reference for scheduling purposes, etc.

At OPERATION 420, a response is provided to the user 130 on behalf of the agent owner 120 via the communication channel 132 that the communication from the user 130 was received at OPERATION 414. The method may return to OPERATION 414, where a next communication from the user 130 is received. For example, the next communication may include feedback from the user 130 indicating whether the response provided by the personalized automated agent 116 resolves the user's request. The method 410 may continue to OPERATION 416, where the feedback is analyzed, and a determination is made as to whether the response provided by the personalized automated agent 116 resolves the user's request. When a determination is made that the response did not resolve the user's request, an urgency level of the request is elevated. At OPERATION 418, the personalized knowledge database 110 is queried for a response to the request based at least in part on the level of urgency, and a response is generated. At OPERATION 420, the response is provided to the user 130 via the communication channel. OPERATIONS 414-420 may be repeated until a response is provided that resolves the user's request, or until an urgency level of the user's request is elevated to a highest level. The method 410 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
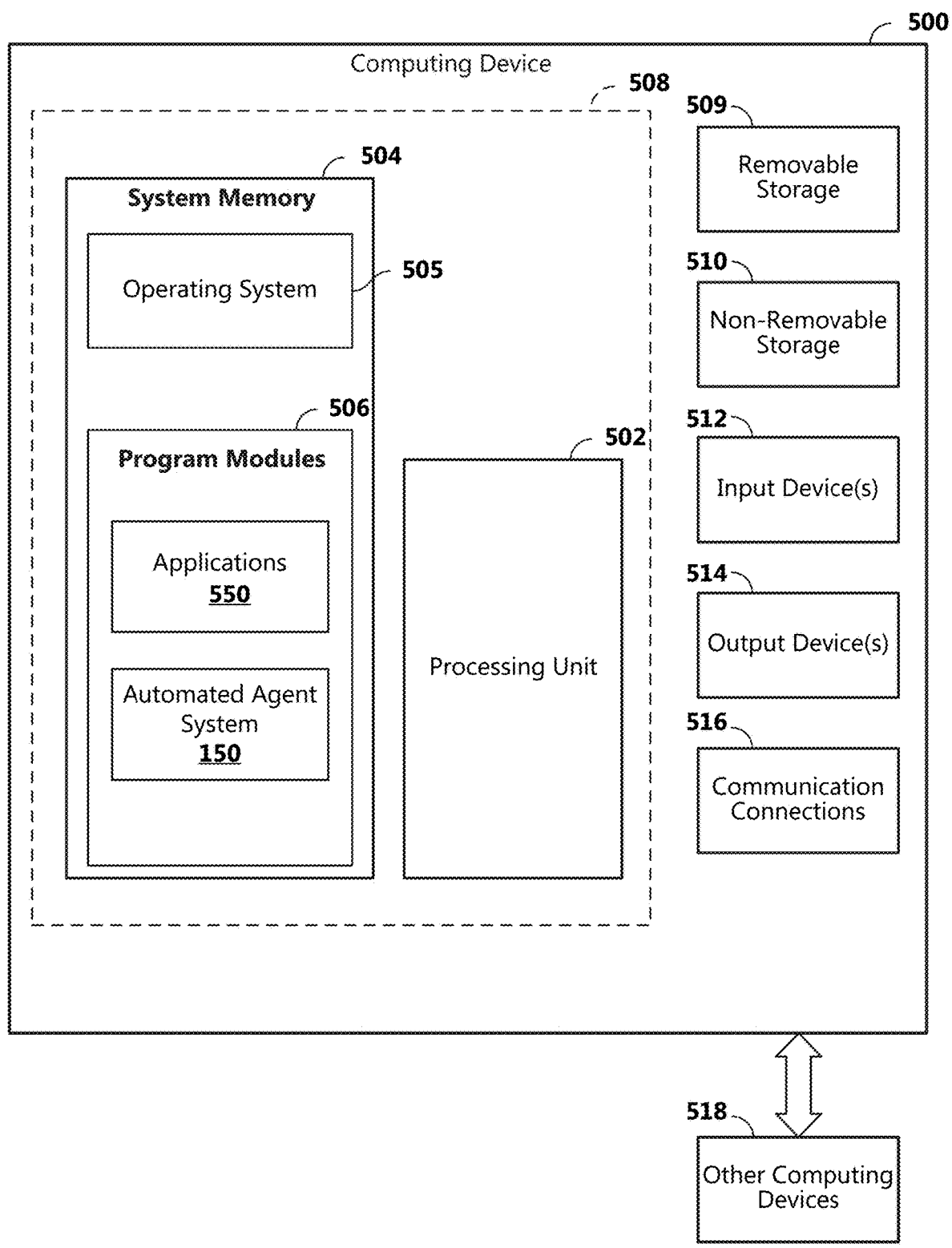
FIG. 5 is a block diagram illustrating physical components of a computing device with which examples may be practiced.
Figure 6A:
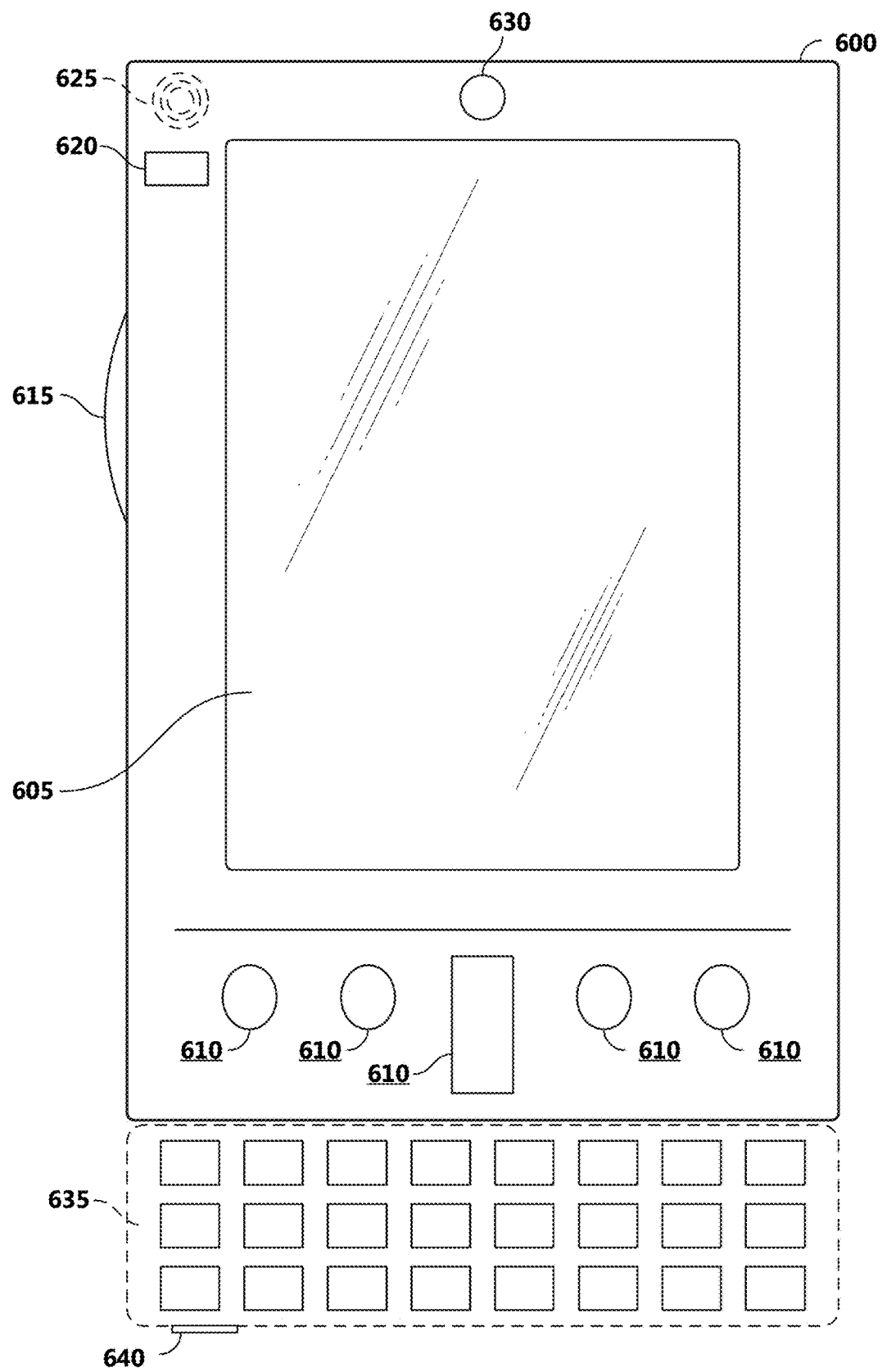
FIGS. 6A and 6B are block diagrams of a mobile computing device with which aspects may be practiced.
Figure 6B:
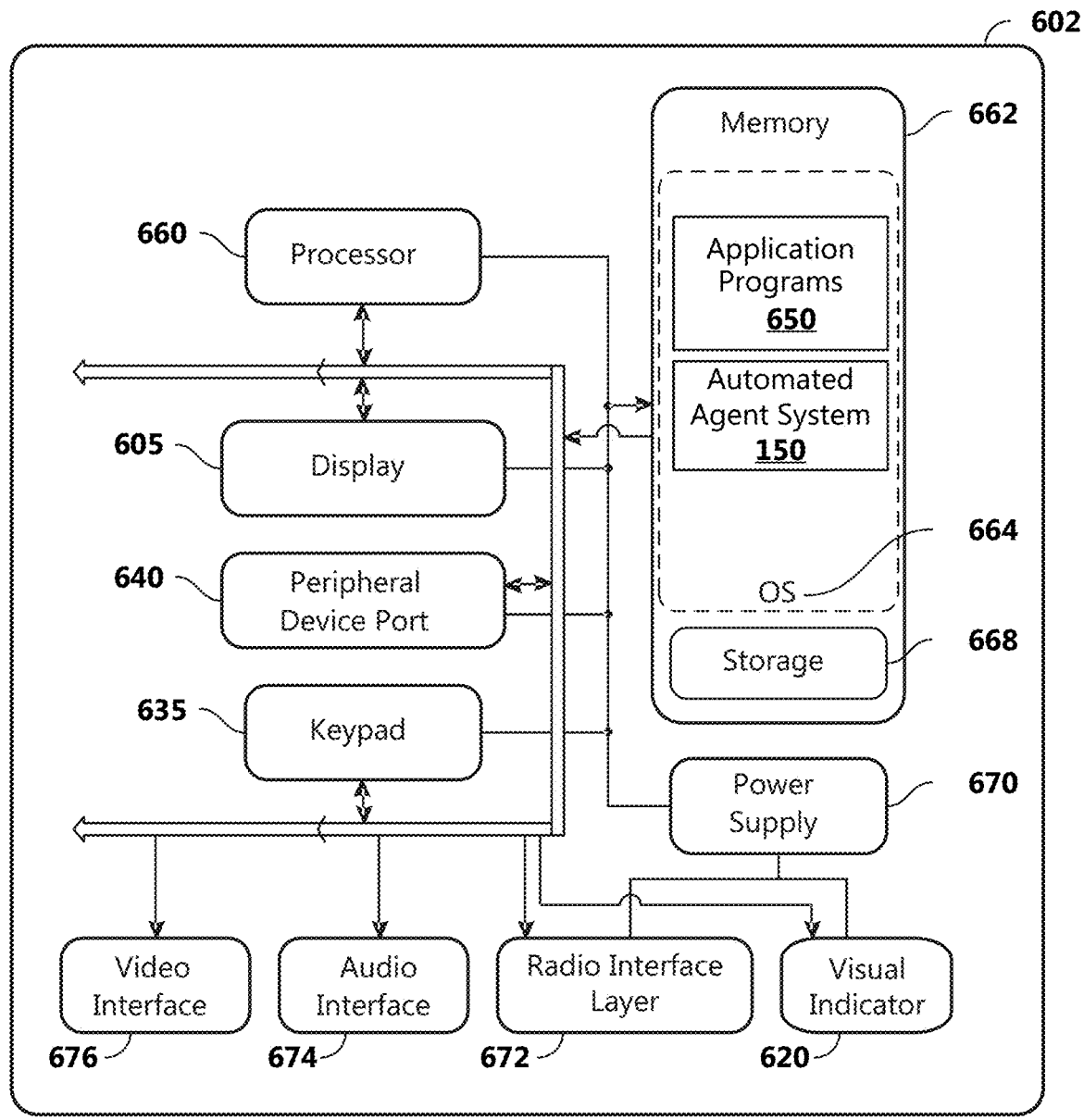
Figure 7:
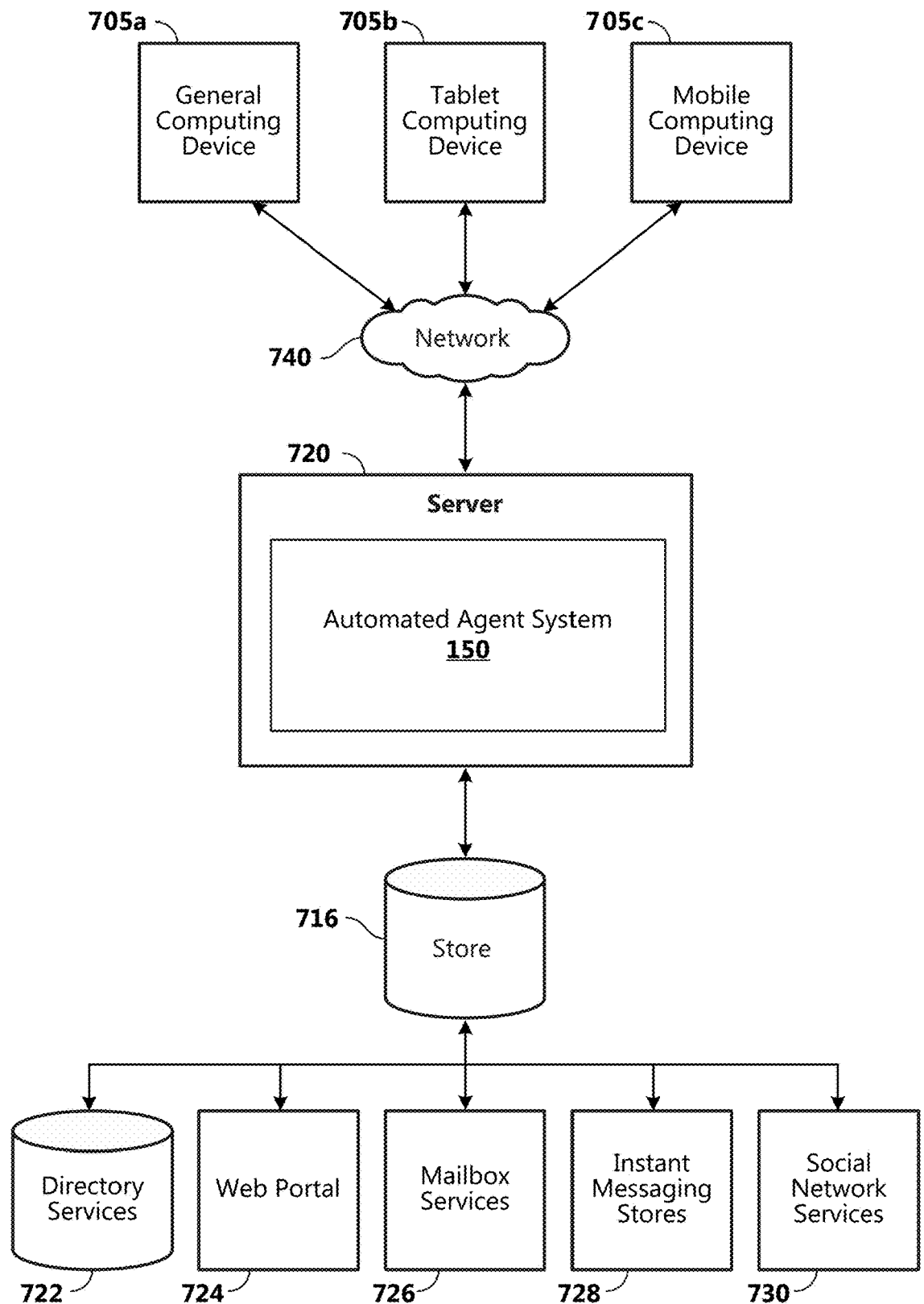
FIG. 7 is a block diagram of a distributed computing system in which aspects may be practiced.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the automated agent system 150. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., automated agent system 150) perform processes including, but not limited to, one or more of the stages of the method 400 illustrated in FIG. 4A and method 410 illustrated in FIG. 4B. According to an aspect, other program modules are used in accordance with examples and include applications such as electronic mail and contacts applications, word processing applications, spreadsheet applications, database applications, slide presentation applications, drawing or computer-aided drafting application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the automated agent system 150 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing personalized automated assistance as described above. Content developed, interacted with, or edited in association with the automated agent system 150 is enabled to be stored in different communication channels or other storage types. For example, various documents may be stored using a directory service 722, a web portal 724, a mailbox service 726, an instant messaging store 728, or a social networking site 730. The automated agent system 150 is operative to use any of these types of systems or the like for providing personalized automated assistance, as described herein. According to an aspect, a server 720 provides the automated agent system 150 to clients 705a,b,c. As one example, the server 720 is a web server providing the automated agent system 150 over the web. The server 720 provides the automated agent system 150 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing personalized automated assistance, comprising:
   generating a personalized knowledge database for an agent owner based on context specific to the agent owner that includes one or more of email conversations, calendar data, an organization chart, and a document database associated with the agent owner;
   analyzing the context specific to the agent owner to identify entities and a relationship between the entities for storage in the personalized knowledge database;
   receiving a request from a user to the agent owner via a communication channel over a network; and
   in response to a determination that the agent owner is unavailable to respond to the request:
      analyzing the request to determine an intent, the determined intent including to receive information about a topic;
      determining a level of urgency of the request;
      querying the personalized knowledge database to retrieve information to resolve the request based at least in part on the determined level of urgency, wherein the retrieved information includes one or more of: a document associated with the topic retrieved from the document database, contact information of the agent owner or an expert in the agent owner's organization on the topic retrieved from the email conversations or the organization chart, and an availability of the agent owner retrieved from the calendar data;
      generating a response based on the retrieved information; and
      automatically providing the response to the user on behalf of the agent owner via the communication channel over the network.

2. The method of claim 1, further comprising:
   receiving feedback from the user, wherein the feedback is associated with the provided response to the request;
   analyzing the feedback for determining whether the response resolves the user's request;
   when the response does not resolve the user's request, elevating the determined level of urgency of the request;
   querying the personalized knowledge database to retrieve additional information to resolve the request based at least in part on the elevated level of urgency;
   generating another response based on the retrieved additional information; and
   providing the other response to the user on behalf of the agent owner via the communication channel.

3. The method of claim 2, further comprising analyzing the feedback for determining a level of frustration of the user.

4. The method of claim 3, wherein analyzing the feedback comprises:
   performing sentiment analysis; and
   assigning a score to the request based on the determined level of frustration of the user.

5. The method of claim 3, wherein determining the level of urgency of the request comprises triaging the request based at least in part on the determined level of frustration of the user.

6. The method of claim 1, wherein determining the level of urgency of the request comprises assigning a score to the request based on at least one of:
   an identity of the user;
   the user's position or title;
   a relationship between the agent owner and the user;
   a deadline included in the request; and
   the intent of the request.

7. The method of claim 1, wherein receiving the request from the user comprises receiving the request from the agent owner.

8. The method of claim 1, further comprising:
   receiving information in a communication, wherein the information includes entities and a relationship between the entities;
   analyzing the communication for identifying the entities and the relationship between the entities; and
   storing the entities and the relationship between the entities in a semantic graph database.

9. The method of claim 8, further comprising querying the semantic graph database to retrieve the information to resolve the request.

10. The method of claim 1, wherein providing the response to the user on behalf of the agent owner via the communication channel comprises selecting the communication channel from a group comprising:

an email;
a text message;
text-to-speech; and
a personal digital assistant.

11. The method of claim 1, wherein generating the personalized knowledge database for the agent owner based on the context specific to the agent owner comprises:
mining one or more data collections associated with the agent owner to retrieve the one or more of the email conversations, the calendar data, the organization chart, and the document database associated with the agent owner;
extracting keywords, topics, categories, and entities from content in the one or more data collections;
identifying relationships between the extracted keywords, topics, categories, and entities;
calculating degrees of similarity between the extracted keywords, topics, categories, and entities; and
storing the extracted keywords, topics, categories, and entities, identified relationships, and calculated degrees of similarity in the personalized knowledge database.

12. A system for providing personalized automated assistance, comprising:
a processing unit; and
a memory, including computer readable instructions, which when executed by the processing unit is operable to provide an automated agent system operative to:
generate a personalized knowledge database for an agent owner based on context specific to the agent owner, wherein the context includes one or more of email conversations, calendar data, an organization chart, and a document database associated with the agent owner;
analyze the context specific to the agent owner to identify entities and a relationship between the entities for storage in the personalized knowledge database;
receive a request from a user to the agent owner via a communication channel over a network; and
in response to a determination that the agent owner is unavailable to respond to the request:
analyze the request to determine an intent, the determined intent including to receive information about a topic;
determine a level of urgency of the request;
query the personalized knowledge database to retrieve information to resolve the request based at least in part on the determined level of urgency, wherein the retrieved information includes one or more of: a document associated with the topic retrieved from the document database, contact information of the agent owner or an expert in the agent owner's organization on the topic retrieved from the email conversations or the organization chart, and an availability of the agent owner retrieved from the calendar data;
generate a response based on the retrieved information; and
automatically provide the response to the user on behalf of the agent owner via the communication channel over the network.

13. The system of claim 12, wherein the automated agent system is further operative to:
receive feedback from the user, wherein the feedback is associated with the provided response to the request;
analyze the feedback for determining whether the response resolves the user's request;
when the response does not resolve the user's request, elevate the determined level of urgency of the request;
query the personalized knowledge database to retrieve additional information to resolve the request based at least in part on the elevated level of urgency;
generate another response based on the retrieved additional information; and
provide the other response to the user on behalf of the agent owner via the communication channel.

14. The system of claim 13, wherein the automated agent system is further operative to perform sentiment analysis on the feedback for determining a level of frustration of the user.

15. The system of claim 14, wherein in determining the level of urgency of the request, the automated agent system is operative to triage the request based at least in part on the determined level of frustration of the user.

16. The system of claim 15, wherein in triaging the request, the automated agent system is operative to:
determine a tone or cordiality level of a personalized automated agent;
determine personal information associated with the agent owner to provide to the user;
determine the agent owner's return date if the agent owner is out-of-office; or
query the agent owner's calendar for scheduling a meeting with the agent owner.

17. Computer storage media including computer readable instructions, which when executed by a processing unit is operable to provide an automated agent system operative to:
generate a personalized knowledge database for an agent owner based on context specific to the agent owner that includes one or more of email conversations, calendar data, an organization chart, and a document database associated with the agent owner;
analyze the context specific to the agent owner to identify entities and a relationship between the entities for storage in the personalized knowledge database;
receive a request from a user to the agent owner via a communication channel over a network; and
in response to a determination that the agent owner is unavailable to respond to the request:
analyze the request for determining an intent, the determined intent including to receive information about a topic;
determine a level of urgency of the request;
query the personalized knowledge database to retrieve information to resolve the request based at least in part on the determined level of urgency, wherein the retrieved information includes one or more of: a document associated with the topic retrieved from the document database, contact information of the agent owner or an expert in the agent owner's organization on the topic retrieved from the email conversations or the organization chart, and an availability of the agent owner retrieved from the calendar data;
generate a response based on the retrieved information; and
automatically provide the response to the user on behalf of the agent owner via the communication channel over the network.

18. The computer storage media of claim 17, wherein the automated agent system is further operative to:
receive feedback from the user, wherein the feedback is associated with the provided response to the request;

analyze the feedback for determining whether the response resolves the user's request;

when the response does not resolve the user's request, elevate the determined level of urgency of the request;

query the personalized knowledge database to retrieve additional information to resolve the request based at least in part on the elevated level of urgency;

generate another response based on the retrieved additional information; and provide the other response to the user on behalf of the agent owner via the communication channel.

19. The computer storage media of claim 18, wherein the automated agent system is further operative to perform sentiment analysis on the feedback for determining a level of frustration of the user.

20. The computer storage media of claim 19, wherein in determining the level of urgency of the request, the automated agent system is operative to triage the request based at least in part on the determined level of frustration of the user, and wherein in triaging the request, the automated agent system is operative to:

determine a tone or cordiality level of a personalized automated agent;

determine personal information associated with the agent owner to provide to the user;

determine the agent owner's return date if the agent owner is out-of-office; or query the agent owner's calendar for scheduling a meeting with the agent owner.

* * * * *